(12) United States Patent
Brown

(10) Patent No.: US 8,337,193 B2
(45) Date of Patent: Dec. 25, 2012

(54) APPARATUS FOR UNSCRAMBLING AND ALIGNING PREFORMS

(75) Inventor: Paul Brown, Wrexham (GB)

(73) Assignee: La Seda de Barcelona S.A., El prat de Llobregat, Barcelona (ES)

( * ) Notice: Subject to any disclaimer, the term of this patent is extended or adjusted under 35 U.S.C. 154(b) by 193 days.

(21) Appl. No.: 12/744,618

(22) PCT Filed: Aug. 1, 2008

(86) PCT No.: PCT/EP2008/006369
§ 371 (c)(1),
(2), (4) Date: May 25, 2010

(87) PCT Pub. No.: WO2009/068121
PCT Pub. Date: Jun. 4, 2009

(65) Prior Publication Data
US 2010/0255142 A1    Oct. 7, 2010

(30) Foreign Application Priority Data
Nov. 27, 2007   (EP) .................................... 07022926

(51) Int. Cl.
*B29C 31/08* (2006.01)
*B29C 49/42* (2006.01)

(52) U.S. Cl. ....................... 425/534; 198/389
(58) Field of Classification Search ............... 198/389; 425/534
See application file for complete search history.

(56) References Cited

U.S. PATENT DOCUMENTS

| | | | |
|---|---|---|---|
| 2,615,556 A | 10/1952 | Hoopes et al. | |
| 2,988,247 A | 6/1961 | Garrett | |
| RE25,297 E | 12/1962 | Garrett | |
| 3,346,095 A | 10/1967 | Dixon | |
| 3,517,797 A | 6/1970 | Daleffe et al. | |

(Continued)

FOREIGN PATENT DOCUMENTS

FR    2 864 050 A    6/2005

OTHER PUBLICATIONS

International Search Report and Written Opinion for PCT/EP2008/006369, ISA/EP, Rijswijk, NL, mailed Oct. 13, 2008.

(Continued)

*Primary Examiner* — Robert B Davis
(74) *Attorney, Agent, or Firm* — Harness, Dickey & Pierce, P.L.C.

(57) ABSTRACT

The apparatus for unscrambling and aligning preforms comprises two substantially parallel alignment rollers (121) and rotary pushing means (122) mounted above the said alignment rollers for pushing back incorrectly oriented preforms or nested preforms, and is characterized by at least one of the following characteristics (i) or (ii): (i) it comprises stopping means (30, 31) mounted above the alignment rollers (121) for stopping correctly oriented nested preforms (P2/P3) or an incorrectly oriented preform or incorrectly oriented nested preforms (P4/P5) underneath the rotary pushing means (122) until the rotary pushing means push back the stopped preform(s), said stopping means (30, 31) being adapted for letting a correctly oriented preform slide onto the alignment rollers, (ii) it comprises guiding means (34) for lifting an incorrectly oriented preform or incorrectly oriented nested preforms (P4/P5) into contact with the rotary pushing means (122) said guiding means (34) being adapted for letting a correctly oriented preform slide onto the alignment rollers.

13 Claims, 5 Drawing Sheets

U.S. PATENT DOCUMENTS

| | | | | |
|---|---|---|---|---|
| 4,223,778 | A | | 9/1980 | Kontz |
| 4,224,459 | A | | 9/1980 | Froberg |
| 4,244,459 | A | * | 1/1981 | Garrett .................. 198/389 |
| 4,418,482 | A | * | 12/1983 | Aidlin et al. .................. 198/389 |
| 5,186,307 | A | | 2/1993 | Doudement et al. |
| 6,968,936 | B2 | * | 11/2005 | Charpentier .................. 198/389 |
| 7,337,893 | B2 | * | 3/2008 | Charpentier .................. 198/398 |
| 7,887,319 | B2 | * | 2/2011 | Takatomi et al. ............. 425/526 |
| 2007/0108018 | A1 | | 5/2007 | Charpentier |
| 2008/0226763 | A1 | | 9/2008 | Charpentier |

OTHER PUBLICATIONS

Extended European Search Report for EP 07 022 926.5, mailed May 20, 2008.

* cited by examiner

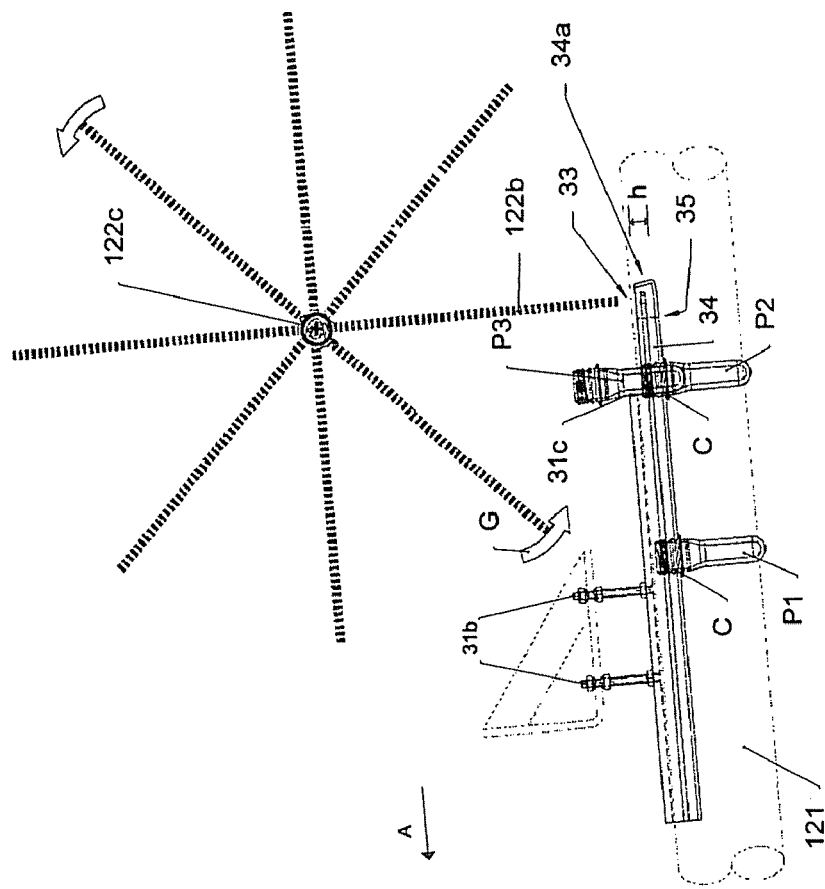
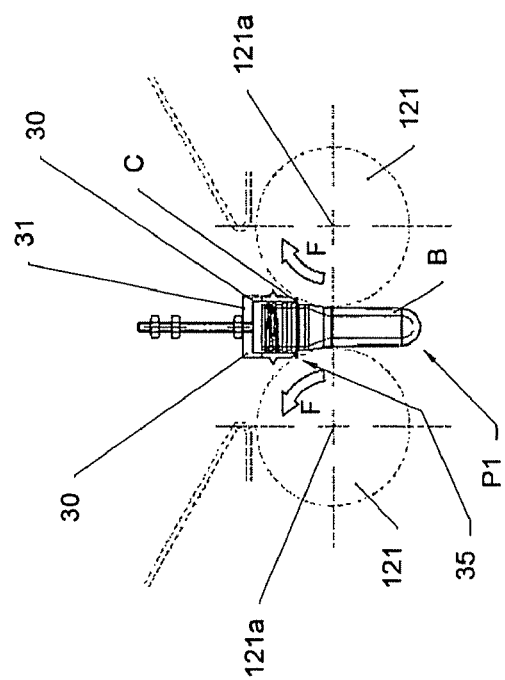
Fig.4
Fig.5

APPARATUS FOR UNSCRAMBLING AND ALIGNING PREFORMS

CROSS-REFERENCE TO RELATED APPLICATIONS

This application is a 371 U.S. National Stage of International Application No. PCT/EP2008/006369, filed Aug. 1, 2008. This application claims the benefit of European Patent Application No. 07022926.5, filed Nov. 27, 2007. The disclosures of such applications are incorporated herein by reference.

FIELD OF THE INVENTION

The present invention relates to an improved apparatus for unscrambling and aligning preforms. This apparatus is used, for example, for feeding preforms to a machine, like a blow-moulding machine for making plastic containers.

PRIOR ART

In the field of plastic packaging, a well-known technique widely used for manufacturing plastic containers is the two stages injection and blow-moulding technique. In a first stage, plastic preforms are moulded by injection in an injection machine. A preform has a substantially tubular body that is closed at one bottom end and is opened at the other upper end. A preform also comprises a neck support ring in its upper part, close to its opened mouth. In a second stage, the preforms are fed to a blow-moulding machine that is used for making bi-axially oriented containers by stretching and blowing each preform in a mould.

In this two stages injection and blow-moulding technique, the injection machine for manufacturing the preforms and the blowing-moulding machine for manufacturing the containers from the preforms are two independent machines. In such case, a feeding system of the type illustrated in FIG. 1 is used generally for feeding the blowing-moulding machine with aligned and correctly oriented preforms. More generally, such a feeding system can be used for feeding any machine with aligned and correctly oriented preforms.

More particularly, such a feeding system comprises an apparatus for unscrambling and aligning the preforms, and generally referred as "unscrambler". An unscrambler generally comprises two rotary alignment rollers which are inclined to the horizontal and which are substantially parallel to each other. These two rollers are separated from each others in such a way to leave a space along and between the rollers for the body of the preforms. The distance between the two rollers is however sufficiently small for enabling the two rollers to retain the preforms by their neck support ring.

In operation, the preforms fall under the effect of gravity onto the alignment rollers which are driven in rotation in opposite directions. Under the combined effect of gravity and rotation of the alignment rollers, the preforms tend to move and to be oriented between the rollers in an upright position. Correctly oriented preforms are thus aligned and supported on the two rollers by their neck support ring, while the body of the preforms hangs down between the rollers. The aligned and correctly oriented preforms slide under the effect of gravity along the inclined alignment rollers down to a downstream machine, and for example a blow-moulding machine.

In order to improve orientation and positioning of the preforms between the alignment rollers, unscramblers of the prior art further comprise a rotary bladed wheel which is mounted above the two alignment rollers. The axis of rotation of this bladed wheel is transverse, more preferably substantially perpendicular, to the axis of rotation of the rollers. In operation, the bladed wheel is driven in rotation at a pre-established speed in such a way that the blades of the wheel sweep the space above the rollers and push back preforms that are not correctly oriented and positioned between the two rollers, and also nested preforms that can be correctly oriented and supported by the roller by the neck support ring of the lower preform. The principle of this rotary bladed wheel is that statistically the preforms become in theory correctly oriented and positioned after a certain number of pushes.

In practise, the usual unscramblers with rotary bladed wheel often malfunction. Actually, in operation some preforms (a preform alone or nested preforms) that are not correctly oriented are not pushed back by the wheel, then slide beyond the bladed wheel and are never correctly oriented on the alignment rollers. Such incorrectly oriented preforms (preforms alone or nested preforms) cause a jam at the output of the unscramblers. It happens also that nested preforms that are correctly oriented on the alignment rollers are not pushed back by the wheel and slide beyond the bladed wheel. Such correctly oriented but nested preforms also cause a jam at the output of the unscramblers. These jams may lead to a stoppage of the feed of preforms at the input of the downstream machine (for example a blow-moulding machine) and may cause a prejudicial shutdown of this machine. When a jam occurs, a fastidious manual intervention is required for removing the jammed preform(s).

OBJECTIVE OF THE INVENTION

The objective of the invention is to propose a simple and efficient solution to increase the reliability of aforesaid unscramblers of the prior art and to decrease the number of preform jams downstream from such unscramblers.

SUMMARY OF THE INVENTION

This objective is achieved by the apparatus for unscrambling and aligning preforms as defined in claim 1.

This apparatus of the invention is characterized by at least one of the following characteristics (i) or (ii):
  (i) it comprises stopping means mounted above the alignment rollers for stopping correctly oriented nested preforms or an incorrectly oriented preform or incorrectly oriented nested preforms underneath the rotary pushing means until the rotary pushing means push back the stopped preform(s), said stopping means being adapted for letting a correctly oriented preform slide onto the alignment rollers,
  (ii) it comprises guiding means for lifting an incorrectly oriented preform or incorrectly oriented nested preforms into contact with the rotary pushing means, said guiding means being adapted for letting a correctly oriented preform slide onto the alignment rollers.

By the wording "correctly oriented preform", it is meant therein that the preform is supported and suspended in its upright position onto the alignment rollers by its neck support ring. The wording "incorrectly oriented preform" used therein means any other orientation of a preform, wherein the preform does not fulfil the above definition of "correctly oriented preform". By the wording "correctly oriented nested preforms", it is meant therein that the preforms are nested and are supported and suspended in their upright position onto the alignment rollers by the neck support ring of the lower preform. The wording "incorrectly oriented nested preforms"

used therein means any other orientation of nested preforms that does not fulfil the above definition of "correctly oriented nested preforms".

In one variant, only the said characteristic (i) can be implemented. In another variant, only the said characteristic (ii) can be implemented. In another variant, both characteristics (i) and (ii) can be implemented.

When both characteristics (i) and (ii) are implemented, the guiding means are preferably positioned upstream from the stopping means, and more particularly extend downwards to the said stopping means.

Other optional technical characteristics of the apparatus of the invention are defined in the appended claims.

A further object of the invention is a feed system for feeding aligned and correctly oriented preforms to a downstream machine, said feed system comprising a bin for storing preforms in bulk, a feed-elevator for removing the preforms from the bin and for lifting up the preforms and dropping the preforms at a pre-established rate into an aforesaid apparatus of the invention for unscrambling and aligning preforms.

A further object of the invention is the use of the aforesaid apparatus of the invention for feeding aligned and correctly oriented preforms to a downstream machine, more especially a blow-moulding machine.

A further object of the invention is a system for manufacturing blow-moulded plastic containers, and comprising a blow-moulding machine and an apparatus of the invention for feeding the blow-moulding machine with aligned and correctly oriented preforms.

BRIEF DESCRIPTION OF THE DRAWINGS

The characteristics and advantages of the invention will appear more clearly on reading the following detailed description which is made by way of non-exhaustive and non-limiting example, and with reference to the appended drawings, as follows:

FIG. 4 is a diagrammatic side view of the guide of FIG. 2 mounted above the alignment rollers and underneath the rotary bladed wheel of an unscrambler, and showing the stop by the guide of correctly oriented nested preforms, FIG. 5 is a end view of the assembly of FIG. 4, FIG. 6 and FIG. 7 are others diagrammatic side views that are similar to FIG. 4, but that show two other examples of stop of incorrectly oriented nested preforms.

DETAILED DESCRIPTION

Figure 1:
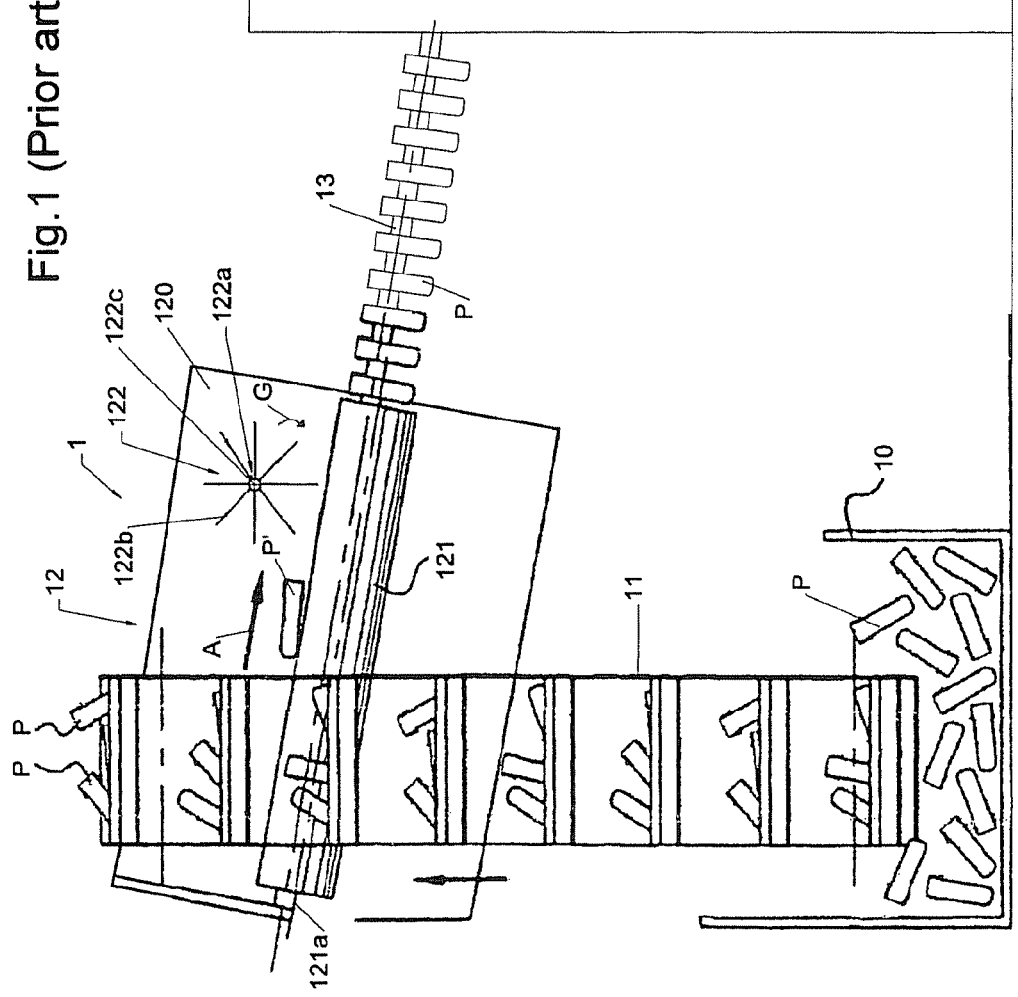
FIG. 1 is a diagrammatic view of a feed system of the prior art which comprises an unscrambler with alignment rollers and rotary bladed wheel, and which is used for feeding a downstream machine with aligned and correctly oriented preforms.

Referring to FIG. 1, a usual feeding system 1 is used for feeding preforms P to a downstream machine 2, for example a blow-moulding machine. The feeding system 1 comprises a bin 10 wherein the preforms P are dumped in bulk, and a feed-elevator 11 for removing the preforms from the bin 10 and for lifting up and dropping the preforms P at a pre-established rate into the upper part of an apparatus 12 for unscrambling and aligning the preforms.

This apparatus 12 comprises a trough 120 and two rotary alignment rollers 121 which are mounted inside the trough 120. The axis of rotation 121a of each roller 121 is inclined to the horizontal. Referring to FIG. 5, the rollers 121 are substantially parallel to each other, and are separated from each other in such a way to leave a space along and between the rollers for the body B of the preforms P. The distance between the two rollers 121 is however sufficiently small for enabling the two rollers to retain a preform P in its upright position by its neck support ring C.

In operation, the two rollers are driven in rotation in two opposite directions (FIG. 5/arrows F). Under the effect of gravity, the preforms P fall in the trough 120 onto the alignment rollers 121. Under the combined effects of gravity and rotation of the alignment rollers 121, the preforms P tend to move and to be oriented between the rollers 121 in an upright position (FIG. 5). Correctly oriented preforms are thus aligned and supported on the two rollers 121 by their neck support ring C, while the body B of the preforms hangs down between the rollers 121. The aligned and correctly oriented preforms P slide under the effect of gravity along the inclined alignment rollers 121 down to a feed rail 13 which guides the preforms down to the entry of the downstream machine 2. In this feed rail 13, the preforms P gather in a continuous line at the entry of the downstream machine 2.

The sliding direction of the preforms onto the rollers 121 through the unscrambling and aligning apparatus 12 is identified by arrow A on the figures. The words "upstream" and "downstream" used therein are defined in reference to this sliding direction A.

The apparatus 12 further comprises rotary pushing means 122 which are mounted above the two rotary rollers 121. These rotary pushing means 122 are used for pushing back preforms that are not correctly oriented and positioned between the two rollers 121 (like preforms P' on FIG. 1), and also nested preforms that can be correctly oriented and supported by the rollers 21 by the neck support ring C of the lower nested preform.

In the particular variant of FIG. 1, theses rotary pushing means 122 are constituted by a rotary wheel comprising a rotary shaft 122a fitted with blades 122b. The axis of rotation of the shaft 122a is substantially perpendicular to the axis of rotation 121a of the rollers 121. In operation, the shaft 122a is driven in rotation at a pre-established speed in the direction identified by arrow G on the figures. The blades 122b of the wheel sweep the space above the rollers 121 and thus push back preforms that are not correctly oriented or nested preforms.

In practise, such a bladed wheel 122, when used alone, is however not reliable, and in operation some preforms that are not correctly oriented or some nested preforms can slide down beyond the bladed wheel 122 and provoke a prejudicial jam on the feed rail 13.

According to the invention, in order to increase the reliability of the unscrambling and aligning apparatus 12, a novel guide 3 is mounted above the rollers 121 and is used in combination with the rotary pushing means 122.

Figure 2:
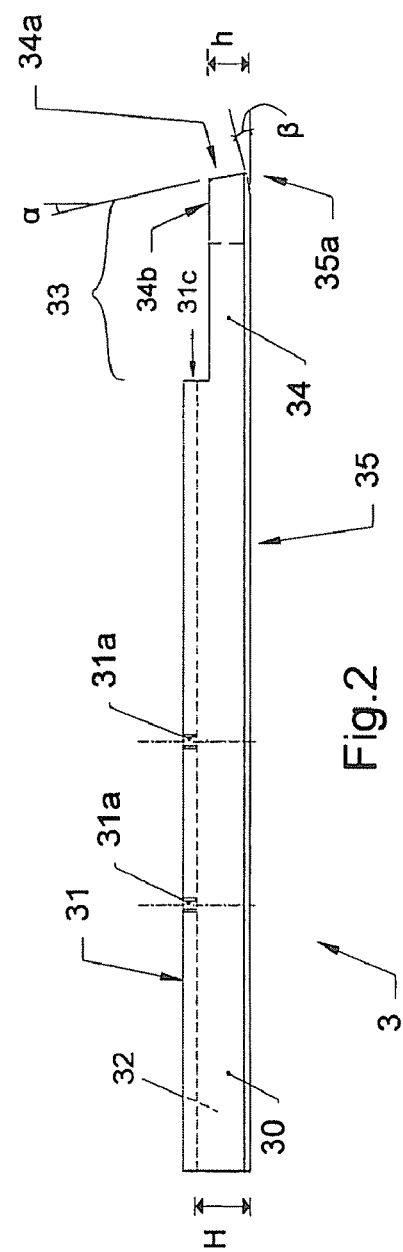
FIG. 2 is a side view of a novel guide of the invention.
Figure 3:
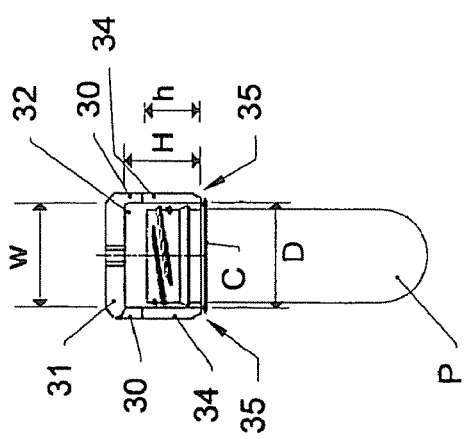
FIG. 3 is an end view of the guide of FIG. 2, with a correctly oriented preform.

FIGS. 2 and 3 show a particular structure for this guide 3, which is now going to be described in details, but bearing in mind that the invention is not limited however to this particular structure.

In the variant of FIGS. 2 and 3, the guide 3 is constituted by an inverted U-shaped profile, for example a stainless hot rolled flat bar, comprising two main vertical sidewalls 30 joined together by an upper wall 31. The two main vertical sidewalls 30 and the upper wall 31 delimit an internal channel 32 of height H and width W for the preform neck (FIG. 3). Threaded holes 31a are pierced through the upper walls 31, and are used for fastening the guide 3 above the rollers 121 by means for example of screws 31b (see e.g. FIG. 4).

At its upstream end, the guide 3 comprises an upper L-shaped cut 33. In the region of this cut 33, the guide 3 has no upper wall, but has only upstream sidewalls 34 of smaller height h which are an extension of the main sidewalls 30. Referring to FIG. 3, the distance W (i.e. width of channel 32) between the sidewalls 30 (or between the upstream sidewalls 34 of smaller height h) is preferably smaller than the diameter D of the neck support ring C of a preform P.

Referring to FIGS. 4 and 5, the guide 3 is mounted above and inbetween the two rollers 121. The lower edges 35 of the sidewalls 30 and 34 are parallel to the axis 121a of the rollers 121 and are close to the surface of the rollers 121. The distance between these lower edges 35 and the surface of the rollers 121 is sufficient for allowing the neck support ring C of a preform P, which is correctly oriented and suspended on the rollers 121 in its upright position, to slide between the lower edges 35 and the surface of the rollers 121.

In the particular variant of FIG. 2, the lower edges 35 of the sidewalls 34 are bevelled at their upstream end 35a [FIG. 2/angle β] in order to facilitate the entrance of the neck support ring C of a correctly oriented preform (P1) between said lower edges 35 and the rollers 121.

Figure 6:
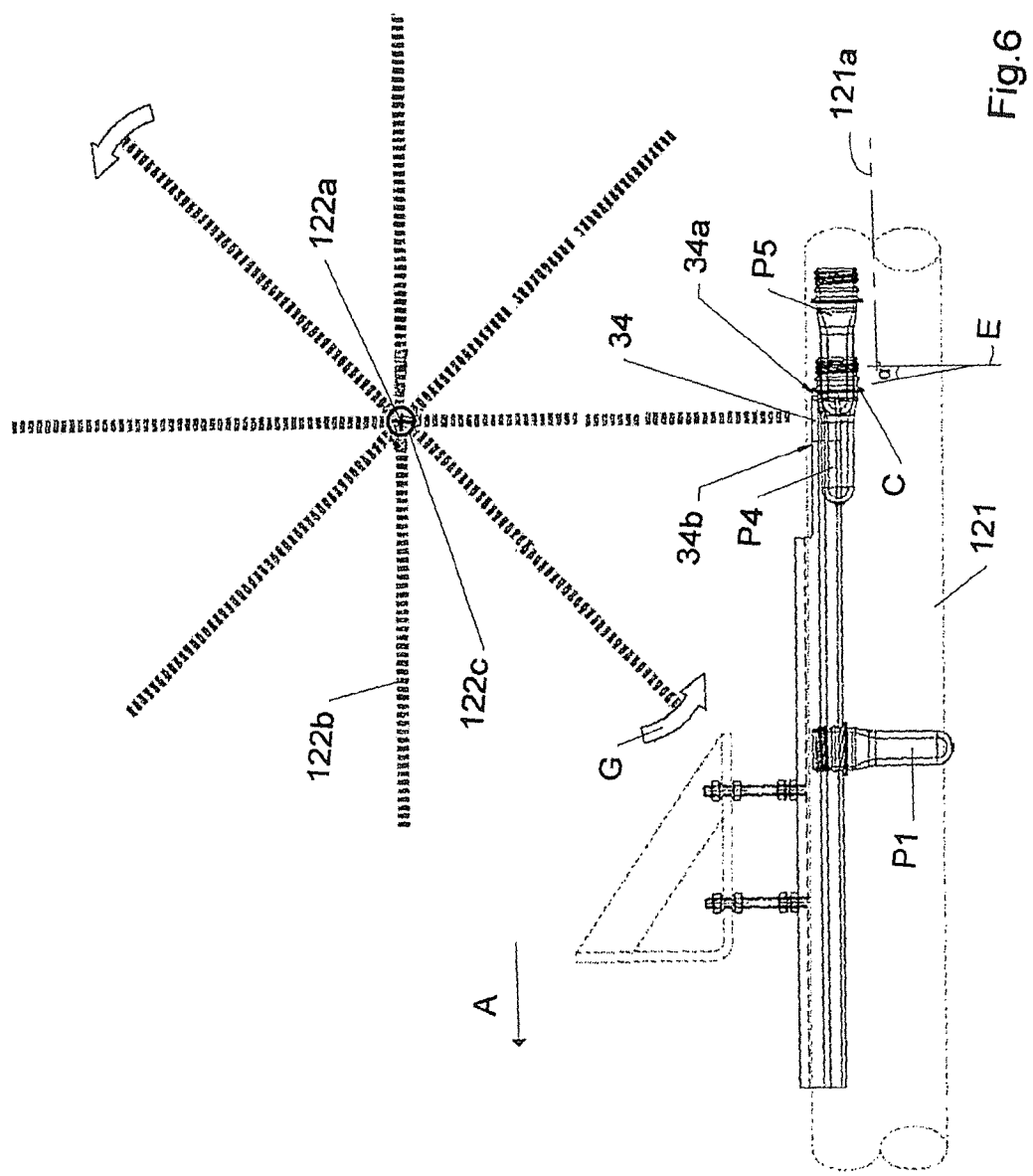
Figure 7:
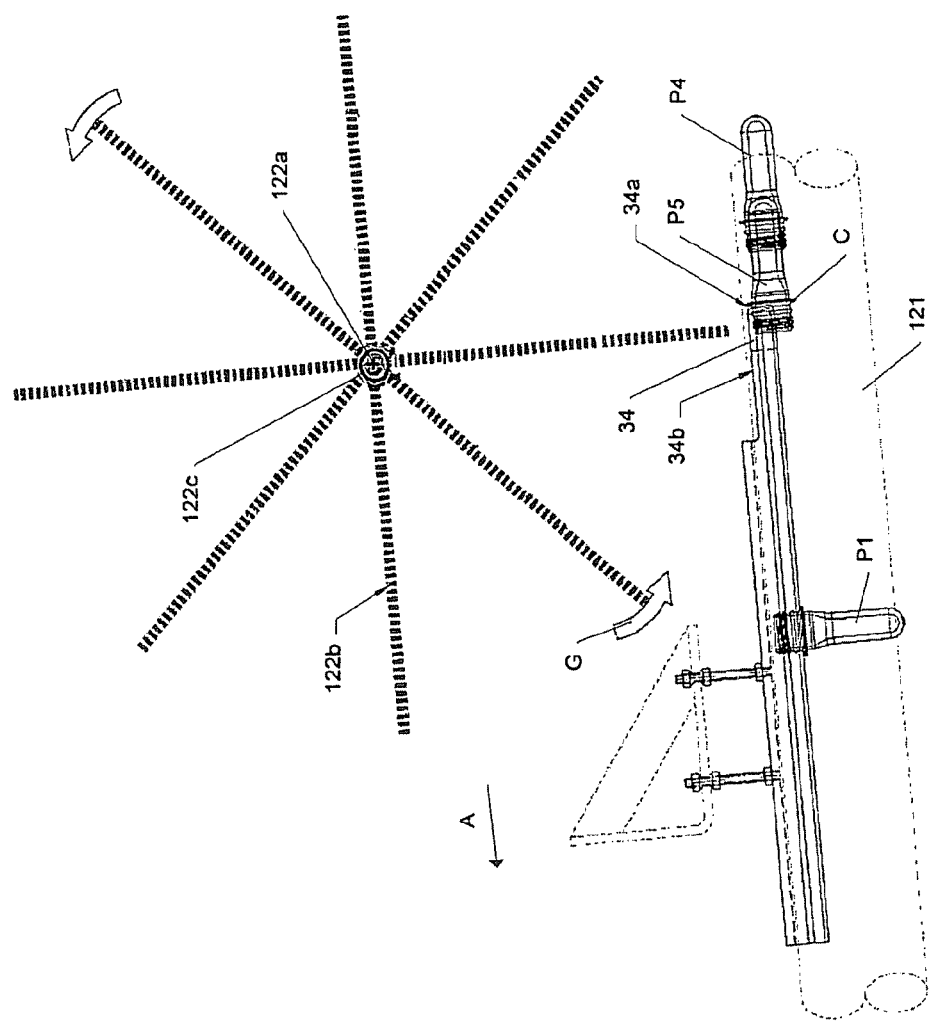

In reference to FIGS. 4, 6 and 7, the guide 3 is fastened with regard to the bladed wheel 122 in such way that the upstream front edge 31c of the upper wall 31 is positioned underneath the bladed wheel 122, more particularly at a position downstream from the axis of rotation 122c of the bladed wheel 122. Furthermore, the upstream front edges 34a of the two sidewalls 34 of smaller height h are positioned underneath the bladed wheel 122, in particular upstream from the axis of rotation 122c of the bladed wheel 122. The upper wall 31 does not stop the rotation of blades 122b, and the height h of the sidewalls 34 is also sufficiently small for allowing the rotation of the blades 122.

In reference to FIG. 4, when a correctly oriented preform is supported in its upright position between the two rollers 121, like for example the preform referenced P1, the guide 3 does not stop this correctly oriented preform P1, and said correctly oriented preform P1 slides downwardly between the rollers 121 and the guide 3 beyond the rotary bladed wheel 122. When nested preforms P2/P3, with the lower preform P2 that is correctly oriented, manage to slide underneath the bladed wheel 122, such nested preforms P2/P3 are necessarily temporarily stopped underneath the bladed wheel 122 by the upstream front edge 31c of the guide 3, until the next blade 122b pushes back the nested preforms P2/P3 for recycling (in the direction opposite to arrow A). Under the impact of the blade, the nested preforms P2/P3 are also very often denested.

In reference to FIG. 6 or FIG. 7, when incorrectly oriented nested preforms P4/P5 slide onto the rollers 121 down to the guide 3, they are firstly temporarily stopped by the front edges 34a of the two sidewalls 34 of smaller height h. Advantageously, when the distance W between the sidewalls 34 is smaller than the diameter D of the neck support ring C of the preforms, even in the particular case where the longitudinal axis of the nested preforms is parallel to the axis of the rollers 121, the neck support ring C of one of the nested preforms is necessarily stopped by the front edges 34a of the two sidewalls 34 (as shown on FIGS. 6 and 7).

Then under pressure of the other preforms that are continuously fed behind, the stopped nested preforms P4/P5 are most often lifted up onto the upper edges 34b of the sidewall 34, and are thus brought upwardly into contact with the rotary blades 122b of the wheel 122, and pushed back for recycling by the bladed wheel 122.

Once the nested preforms P4/P5 are positioned onto the upper edges 34 of the sidewalls 34, they are stopped vertically by the upper edges 34a and are thus necessarily maintained at level that is sufficiently close to the rotary blade 122b for obtaining a reliable push back of the preforms by the blades.

Furthermore, once the nested preforms P4/P5 are positioned onto the upper edges 34b of the sidewalls 34, they can not slide down beyond the wheel 122 because they are stopped at least by the upstream front edge 31c of the upper wall 31.

In some cases, it may also happen that under the pressure of the preforms that are continuously fed behind, nested preforms P4/P5 that have been stopped by the front edges 34a are displaced in such a way that the lower preform P4 becomes correctly oriented and positioned between rollers 121. In that case, the correctly oriented nested preforms P4/P5 can pass trough the sidewalls 34, with the neck support ring C of the lower preform P4 being guided between the lower edges 35 of the sidewalls 34 and the rollers 121. In such a case, if the nested preforms P4/P5 reach the upper wall 31 of the guide 3, they are necessarily stopped by the front edge 31c of said upper wall 31 (same case than for nested preforms P2/P3 on FIG. 4).

If an incorrectly oriented preform alone slides on the rollers 121 down to the guide 3, it is also firstly stopped by the front edges 34a of the two sidewalls 34 of smaller height h, and then most often lifted up onto the upper edges 34b of the sidewalls 34 and brought upwardly into contact with the blades 122b of the wheel, and then necessarily pushed back for recycling by the bladed wheel 122. In some cases, it may also happen that under pressure of the preforms that are continuously fed behind, an incorrectly oriented preform that has been stopped by the front edges 34a is displaced in such a way that it becomes correctly oriented and positioned between rollers 21, without being lifted up onto the upper edges 34b of the sidewalls 34. In such a case, this correctly oriented preform slides down through the guide 3 underneath the lower edge 35 of the guide 3 without being stopped by the front edge 31c (like preform P1 on FIG. 4, 6 or 7), and without coming into contact with the bladed wheel 122.

Preferably, the front edges 34a of the sidewalls 34 are designed in order to facilitate the lifting of a preform or nested preforms onto the upper edges 34b under the pressure of the other preforms continuously fed behind. In particular, in reference to FIG. 6, the front edges 34a of the sidewalls 34 are inclined with reference to a plane E that is perpendicular to the axis of rotation 121a of the rollers 121 at a front angle α of value greater than 0°. A suitable value for this front angle α is for example around 10°.

The invention is not limited to the use of a guide 3 having the particular structure that has been described in reference to the appended drawings, but the scope of protection encompasses any apparatus having the characteristics defined in the claims. In particular, the guide 3 is not necessarily made of one piece, but can be constituted by a monolithic assembly. In another variant of the invention, the guide 3 could be made of two separated elements: upstream guiding means 34 for lifting up incorrectly oriented preforms or incorrectly oriented nested preforms and separated downstream stopping means 30, 31. In another variant, the downstream stopping means could be made only of one stop like the upper wall 31 (i.e. without the sidewalls 30). In another variant of the invention, the guide 3 could be only constituted by the sidewalls 30 and upper wall 31 (i.e. without the sidewalls 34 of smaller height) or could be only constituted by the sidewalls 34 of smaller height h (i.e. without the use of stopping means 30, 31 downstream from the axis of rotation of the rotary pushing means 122). On the drawings, the front edges 34a of the sidewalls 34 are positioned underneath the rotary pushing means 122. In another variant, theses front edges 34a could be also positioned upstream from the rotary pushing means 122.

The invention claimed is:

1. An apparatus for unscrambling and aligning preforms, said apparatus comprising two substantially parallel alignment rollers and rotary pushing means mounted above said alignment rollers for pushing back incorrectly oriented preforms or nested preforms, said apparatus comprising at least one of the following characteristics:
   (i) stopping means mounted above the alignment rollers for stopping correctly oriented nested preforms or an incorrectly oriented preform or incorrectly oriented nested preforms underneath the rotary pushing means until the rotary pushing means push back the stopped preform(s), said stopping means being adapted for letting a correctly oriented preform slide onto the alignment rollers;
   (ii) guiding means for lifting an incorrectly oriented preform or incorrectly oriented nested preforms into contact with the rotary pushing means said guiding means being adapted for letting a correctly oriented preform slide onto the alignment rollers.

2. The apparatus of claim 1, comprising both characteristics (i) and (ii) and wherein the guiding means are positioned upstream from the stopping means.

3. The apparatus of claim 2, wherein the guiding means extend downwards to the stopping means.

4. The apparatus of claim 1, wherein the guiding means are constituted by two parallel sidewalls.

5. The apparatus of claim 4, wherein said sidewalls are separated by a distance that is less than the diameter of the neck support ring of a preform.

6. The apparatus of claim 4, wherein the front edges of the sidewalls are designed to facilitate the lifting of preform(s) onto the upper edges of the sidewalls.

7. The apparatus of claim 6, wherein the front edges of the sidewalls are inclined with reference to a plane that is perpendicular to the axis of rotation of the rollers at a front angle $\alpha$ of value greater than 0°.

8. The apparatus of claim 7, wherein the front angle $\alpha$ is around 10°.

9. The apparatus of claim 4, wherein the lower edges of the sidewalls are bevelled at their upstream end in order to facilitate the entrance of the neck support ring of a correctly oriented preform between said lower edges and the rollers.

10. The apparatus of claim 2, wherein the stopping means and the guiding means are constituted by a guide comprising two main sidewalls of height, that are joined together by an upper wall, and comprising two sidewalls of smaller height that are an extension of said main sidewalls.

11. The apparatus of claim 1, wherein the rotary pushing means are constituted by a bladed wheel.

12. A feed system for feeding aligned and correctly oriented preforms to a downstream machine, and comprising a bin for storing preforms in bulk, a feed-elevator for removing the preforms from the bin and for lifting up the preforms and dropping the preforms at a pre-established rate into an apparatus according to claim 1.

13. A system for manufacturing blow-moulded plastic containers, and comprising a blow-moulding machine and an apparatus of claim 1 for feeding the blow-moulding machine with aligned and correctly oriented preforms.

* * * * *